United States Patent
Chen

(10) Patent No.: US 8,422,545 B2
(45) Date of Patent: Apr. 16, 2013

(54) ADAPTIVE EQUALIZER AND ADAPTIVE EQUALIZING METHOD

(75) Inventor: Wei-Yung Chen, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 95 days.

(21) Appl. No.: 13/028,192

(22) Filed: Feb. 15, 2011

(65) Prior Publication Data
US 2012/0170638 A1    Jul. 5, 2012

(30) Foreign Application Priority Data

Dec. 30, 2010   (TW) ................. 99146934 A

(51) Int. Cl.
*H03K 5/159* (2006.01)

(52) U.S. Cl.
USPC .......... 375/232; 375/345; 455/127.2; 367/65; 330/278

(58) Field of Classification Search .......... 375/229–236, 375/345; 455/127.2, 127.3; 367/65; 330/278
See application file for complete search history.

(56) References Cited

U.S. PATENT DOCUMENTS

| | | | |
|---|---|---|---|
| 5,436,933 A * | 7/1995 | Andruzzi, Jr. | 375/345 |
| 2002/0042256 A1 * | 4/2002 | Baldwin et al. | 455/232.1 |
| 2007/0293180 A1 * | 12/2007 | Rahman et al. | 455/296 |

* cited by examiner

*Primary Examiner* — Curtis Odom
(74) *Attorney, Agent, or Firm* — Jianq Chyun IP Office

(57) ABSTRACT

An adaptive equalizer adapted to compensate a signal transmitted by a channel is provided. The adaptive equalizer includes a signal booster, an amplifier unit and an adaptive control loop. The signal booster receives the signal, adjusts gain for the signal, and outputs the signal which has been adjusted. The amplifier unit is coupled to the signal booster, amplifies the signal and outputs it to the next stage. The adaptive control loop is coupled to the signal booster, detects a ratio of a maximum value and a minimum value of the signal package, and outputs an adjusting signal to adjust the gain of the signal booster to change the maximum value or the minimum value, so that the ratio of the maximum value and the minimum value is not less than a specific value. Furthermore, an adaptive equalizing method is also provided.

26 Claims, 5 Drawing Sheets

ADAPTIVE EQUALIZER AND ADAPTIVE EQUALIZING METHOD

CROSS-REFERENCE TO RELATED APPLICATION

This application claims the priority benefit of Taiwan application serial no. 99146934, filed on Dec. 30, 2010. The entirety of the above-mentioned patent application is hereby incorporated by reference herein and made a part of this specification.

BACKGROUND

1. Field of the Disclosure

The disclosure relates to an equalizer and an equalizing method. Particularly, the disclosure relates to an adaptive equalizer and an adaptive equalizing method.

2. Description of Related Art

Generally, when a high-speed transmitted signal is transmitted through a channel, signal intensity thereof is probably attenuated, which may cause reduction of the signal intensity and increasing of noise jitter, so that a bit error rate of a transmission result is increased, which may influence communication quality. FIG. 1 is waveform and eye diagrams of a signal transmitted in various parts of an electronic system. Referring to FIG. 1, after a signal S1 is enhanced by a driver 110 at a transmitting end of the electronic system 100, it enters a channel 130 for transmission, and before the signal enters the channel 130, according to an eye diagram of the output of the driver 110, it is known that the signal S1 has good signal quality. However, after the channel transmission, the signal S1 is attenuated at an output end of the channel 130 as that shown in an eye diagram of the output of the channel 130, and the signal quality thereof is deteriorated due to the attenuation and noise jitter.

In order to resolve the above problem, a commonly used method is to add a continuous time linear equalizer (CTLE) 120 at a receiving end of the electronic system 100. The CTLE 120 boosts high frequency gain for the signal S1 to compensate a channel loss, so as to improve the signal quality. According to an eye diagram of the output of the CTLE 120, it is known that the compensated signal S1 has similar good quality as that of the signal S1 output by the driver 110.

However, during an actual application, the channel loss is not fixed, and the conventional compensation method has to use an adaptive control device to detect whether the high frequency compensation is optimal. However, many existing structures have limitations in applying the adaptive control device due to, for example, an architecture thereof is too complicated, implementation of a transmission speed of gigabit bytes per second (Gbps) is hard to be achieved, and compensation accuracy of mass production is not high, etc.

Nothing herein should be construed as an admission of knowledge in the prior art of any portion of the invention. Furthermore, citation or identification of any document in this application is not an admission that such document is available as prior art to the invention, or that any reference forms a part of the common general knowledge in the art.

SUMMARY OF THE DISCLOSURE

The disclosure is directed to an adaptive equalizer, which can effectively compensate a channel loss through a simple architecture.

The disclosure is directed to an adaptive equalizing method, adapted to at least the aforementioned adaptive equalizer, by which a channel loss can be effectively compensated.

The disclosure provides an adaptive equalizer adapted to compensate a signal transmitted by a channel. The adaptive equalizer includes a signal booster, an amplifier unit and an adaptive control loop. The signal booster receives the signal, adjusts gain for the signal, and outputs the adjusted signal. The amplifier unit is coupled to the signal booster, amplifies the signal and outputs the signal to a next stage. The adaptive control loop is coupled to the signal booster, detects a maximum value and a minimum value of packages of the signal, and outputs an adjusting signal to adjust the gain of the signal booster to change the maximum value or the minimum value, so that a ratio of the maximum value and the minimum value is not less than a specific value.

The disclosure provides an adaptive equalizing method adapted to compensate a signal transmitted by a channel. The adaptive equalizing method includes following steps. The signal is received, and a gain for the signal is adjusted, and the adjusted signal is output. The signal is amplified and output to a next stage. A maximum value and a minimum value of packages of the signal are detected, and the gain for the signal is adjusted to change the maximum value or the minimum value, so that a ratio of the maximum value and the minimum value is not less than a specific value.

According to the above descriptions, in the disclosure, the adaptive equalizer has a simple architecture, and according to the adaptive equalizing method, usage of a complicated circuit is unnecessary, and any data pattern can be used without pre-detecting the pattern, so that the channel loss can be effectively compensated.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
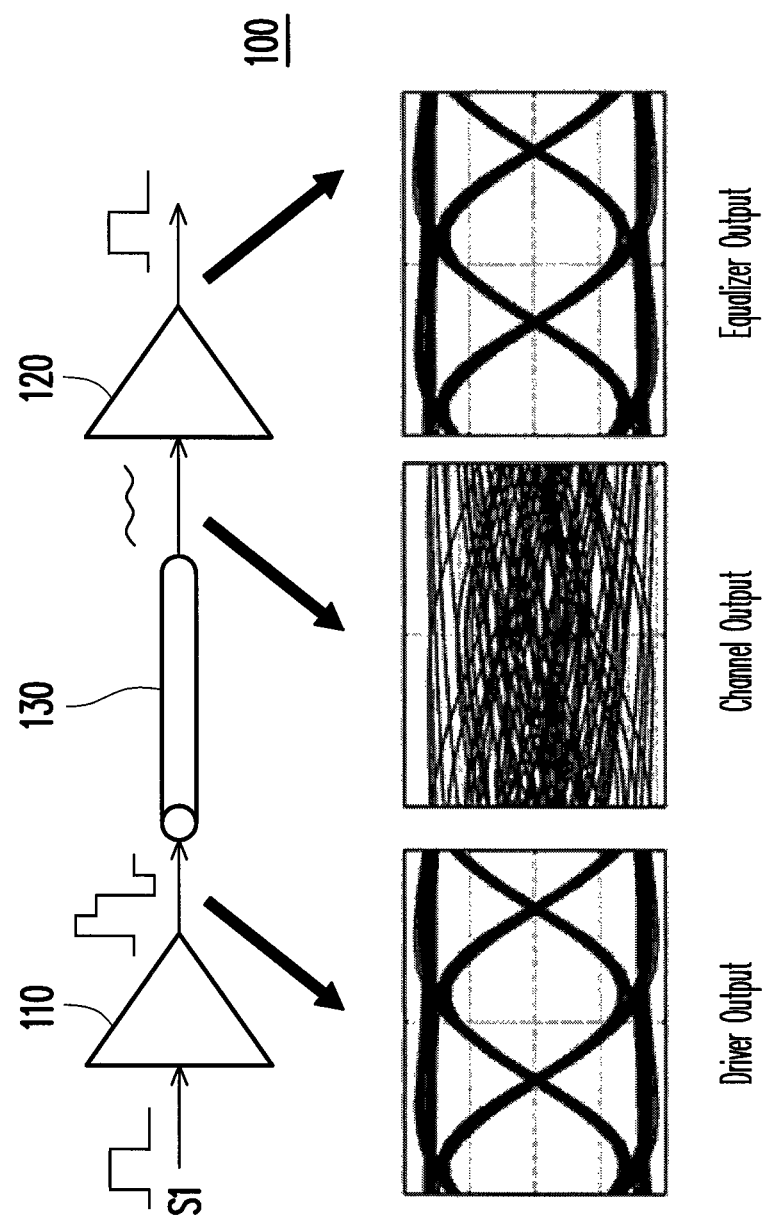
FIG. 1 is waveform and eye diagrams of a signal transmitted in various parts of an electronic system.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 2A:
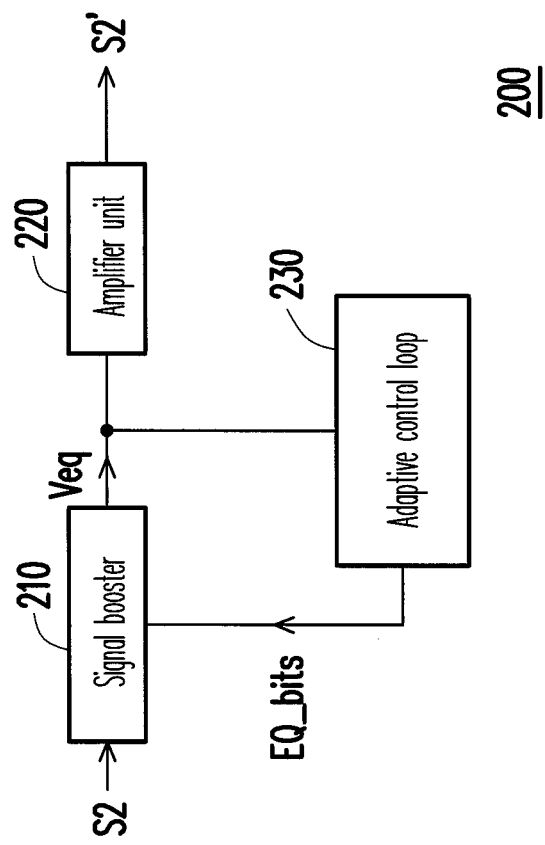
FIG. 2A is a block schematic diagram of an adaptive equalizer according to an exemplary embodiment of the disclosure.

FIG. 2A is a block schematic diagram of an adaptive equalizer according to an exemplary embodiment of the disclosure. Referring to FIG. 2A, in the present exemplary embodiment, the adaptive equalizer 200 is adapted to compensate a signal S2 transmitted by a channel. The adaptive equalizer 200 includes a signal booster 210, an amplifier unit 220 and an adaptive control loop 230.

Figure 2B:
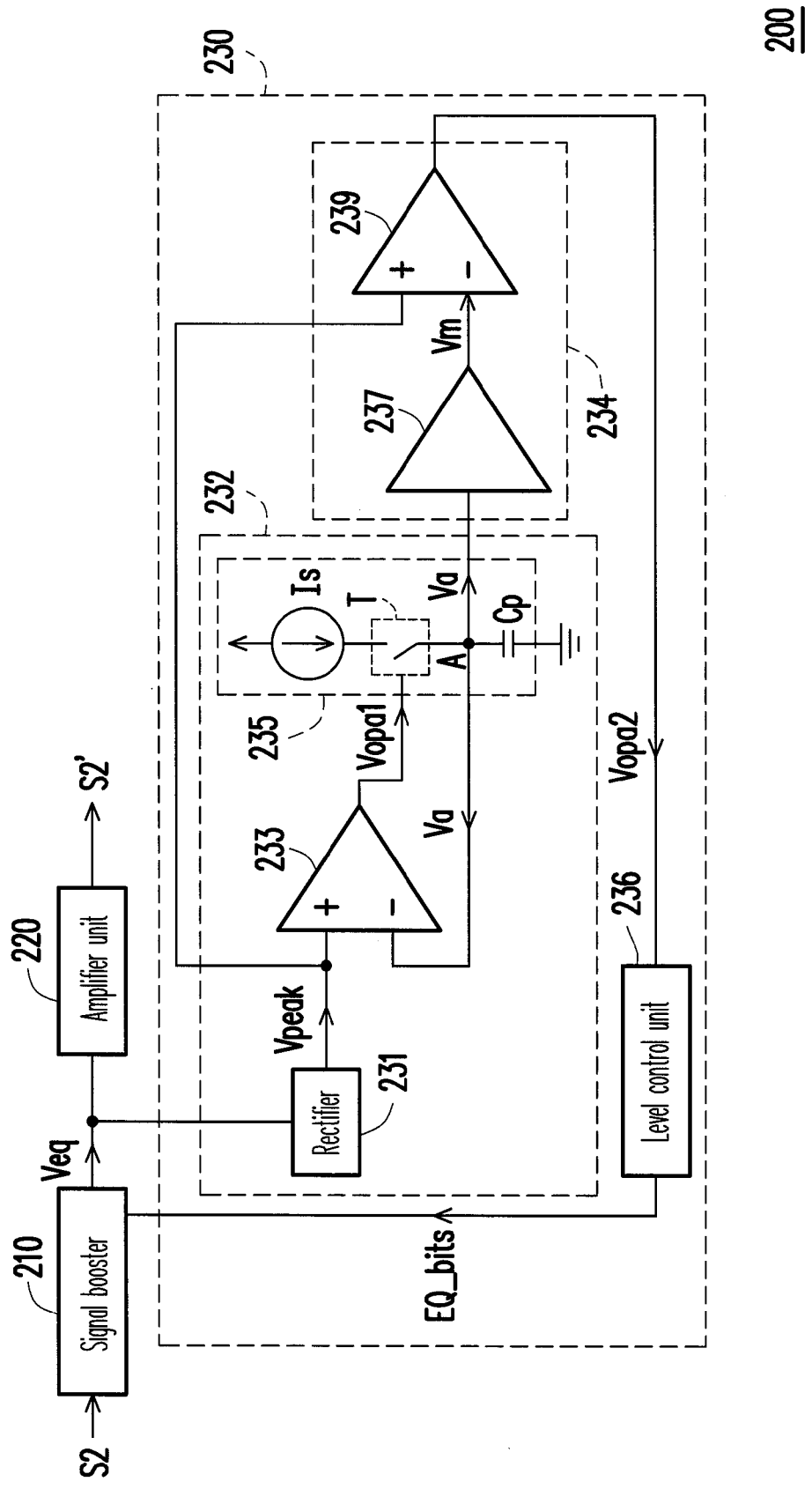
FIG. 2B is a circuit diagram of an adaptive control loop of FIG. 2A.

In detail, FIG. 2B is a circuit diagram illustrating an exemplary implementation of the adaptive control loop 230 of FIG. 2A. Referring to FIG. 2B, in the present exemplary embodiment, the signal booster 210 has a positive gain, and receives the signal S2 transmitted by a channel, and boosts high frequency gain for the signal S2, and then outputs a high frequency-boosted signal Veq to the amplifier unit 220 and the adaptive control loop 230. The amplifier unit 220 is coupled to the signal booster 210 amplifying the signal Veq and outputting an amplified signal S2' to a next stage. The adaptive control loop 230 is coupled to the signal booster 210 for detecting a maximum value and a minimum value of packages of the signal S2, and outputting an adjusting signal EQ_bits to adjust the gain of the signal booster 210 to change the maximum value or the minimum value, so that a ratio of the maximum value and the minimum value is not less than a specific value. Here, the amplifier unit 220 is, for example, a limiting amplifier, though the disclosure is not limited thereto.

Figure 3:
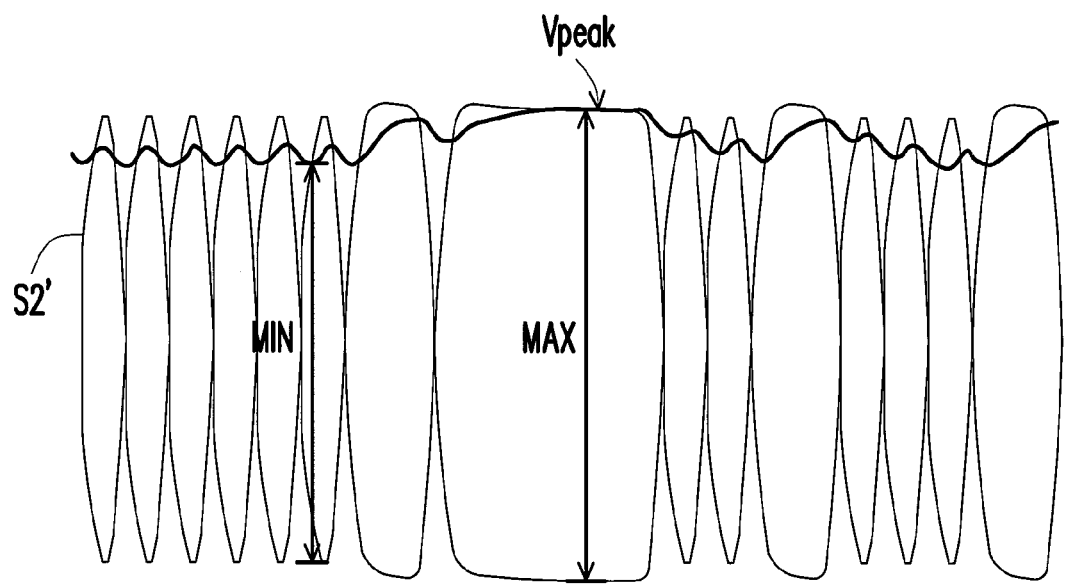
FIG. 3 is a package waveform diagram of a signal S2' of FIG. 2A and FIG. 2B.
Figure 4:
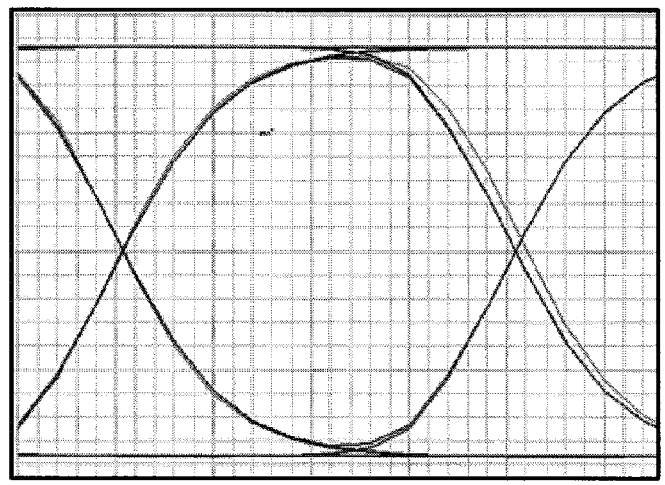
FIG. 4 is an eye diagram corresponding to the signal S2'.

FIG. 3 is a package waveform diagram of the signal S2' of FIG. 2A and FIG. 2B. FIG. 4 is an eye diagram corresponding to the signal S2'. Referring to FIG. 2B to FIG. 4, regarding the signal S2' compensated by the adaptive equalizer 200 of the present exemplary embodiment, the ratio of the maximum value MAX and the minimum value MIN of the signal packages thereof is larger than or equal to the specific value, so that the eye diagram of the corresponding signal S2' can be as that shown in FIG. 4, which presents good signal quality. Here, the signal S2' is, for example, lossless random data. Therefore, after the ratio of the maximum value MAX and the minimum value MN of the packages of the signal S2 is detected, if the ratio is smaller than the specific value, the adaptive control loop 230 can adjust the ratio, so that the ratio is larger than or equal to the specific value, so as to achieve an effect of compensating the signal S2.

In detail, the adaptive control loop 230 of the present exemplary embodiment includes a first comparison unit 232, a second comparison unit 234 and a level control unit 236. The first comparison unit 232 is coupled to the signal booster 210, and receives and rectifies the signal Veq, and compares a voltage peak Vpeak of the rectified signal with a stored voltage Va. Then, the first comparison unit 232 outputs the stored voltage Va corresponding to the voltage peak Vpeak according to the comparison result. The second comparison unit 234 is coupled to the first comparison unit 232, and adjusts the stored voltage Va corresponding to the voltage peak Vpeak to obtain a voltage signal Vm, and compares the adjusted stored voltage (i.e the voltage signal Vm) with the voltage peak Vpeak to output a control signal Vopa2. The level control unit 236 is coupled to the second comparison unit 234, and outputs the adjusting signal EQ_bits to the signal booster 210 according to the control signal Vopa2, so as to adjust a high frequency content of the signal S2.

In detail, in the present exemplary embodiment, the first comparison unit 232 includes a rectifier 231, a first comparator 233 and a voltage storage unit 235. The rectifier 231 is coupled to the signal booster 210 for and receiving and rectifying the signal Veq, and outputting the voltage peak Vpeak of the rectified signal, as that shown in FIG. 3. In FIG. 3, the bold and black signal is the signal processed by the rectifier 231, and the voltage peak Vpeak corresponds to the maximum value MAX of the signal packages. In other words, by using the rectifier 231, the voltage peak Vpeak corresponding to the maximum value MAX of the signal packages can be found and output to the first comparator 233 for comparison.

The first comparator 233 has a first input terminal, a second input terminal and an output terminal. The first input terminal and the second input terminal are, for example, respectively a non-inverting terminal and an inverting terminal, though the disclosure is not limited thereto. The first input terminal (+) of the first comparator 233 is coupled to the rectifier 231 for receiving the voltage peak Vpeak of the rectified signal. The second input terminal (−) of the first comparator 233 receives the stored voltage Va. Then, the first comparator 233 compares the voltage peak Vpeak of the rectified signal with the stored voltage Va to output a comparison signal Vopa1.

The voltage storage unit 235 is coupled to the second input terminal (−) and the output terminal of the first comparator 233 for receiving the comparison signal Vopa1 and providing the stored voltage Va to the first comparator 233 and the second comparison unit 234, where a magnitude of the stored voltage Va is controlled by the comparison signal Vopa1. In the present exemplary embodiment, the voltage storage unit 235 includes a current source Is, a switch device T and a capacitor Cp. The current source Is provides a charging current for charging the capacitor Cp when the switch device T is turned on. The switch device T is coupled to the current source Is and the output terminal of the first comparator 233, and is controlled by the comparison signal Vopa1, so as to be turned on/off in response to a level of the comparison signal Vopa1. One end A of the capacitor Cp is coupled to the switch device T and the second input terminal (−) of the first capacitor 233 for providing the stored voltage Va to the first capacitor 233, and another end of the capacitor Cp is coupled to ground. In the present exemplary embodiment, the current source Is is, for example, an active current source implemented by a current mirror, and the switch device T is, for example, a N-type metal-oxide-semiconductor (NMOS) transistor.

Therefore, when the voltage peak Vpeak is larger than the stored voltage Va, the first comparator 233 outputs the comparison signal Vopa1 with a first level to turn on the switch device T, so that the current source Is charges the capacitor Cp to increase the stored voltage Va. The stored voltage Va is continually increased for a time period. Therefore, when the voltage peak Vpeak is smaller than or equal to the stored voltage Va, the first comparator 233 outputs the comparison signal Vopa1 with a second level to turn off the switch device T. Now, a voltage value recorded at the node A is the voltage peak Vpeak. In other words, when the voltage peak Vpeak is smaller than or equal to the stored voltage Va, the voltage provided to the second comparison unit 234 by the capacitor Cp is the stored voltage Va corresponding to the voltage peak Vpeak.

It should be noticed that in the present exemplary embodiment, the coupling relation of the input terminal and the output terminal of the first comparator 233, the type of the switch device T and the implementation of the current source Is are only used as an example, which are not used for limiting the disclosure.

According to the above operation of the first comparison unit 232, it is know that the first comparison unit 232 is used to detect the maximum value MAX of the signal packages. Namely, after the signal S2 enters the signal booster 210, a part of the signal is output to the rectifier 231, and the first comparator 233 compares the voltage peak Vpeak with the stored voltage Va, so as to charge the stored voltage Va to the voltage peak Vpeak.

On the other hand, the second comparison unit 234 includes an operation unit 237 and a second comparator 239. The operation unit 237 is coupled to the voltage storage unit 235 for adjusting the stored voltage Va corresponding to the voltage peak Vpeak, which, for example, performs a multiplying operation or a dividing operation on the voltage peak Vpeak. Here, the operation unit 237 multiplies the voltage peak Vpeak by a value smaller than one to decrease the voltage peak Vpeak. Therefore, the operation unit 237 can be implemented by a multiplier or a divider. Then, the operation unit 237 outputs the operated signal Vm to the second comparator 239.

The second comparator 239 has a first input terminal, a second input terminal and an output terminal. Here, the first input terminal and the second input terminal are, for example, respectively a non-inverting terminal and an inverting terminal, though the disclosure is not limited thereto. The first input terminal (+) of the second comparator 239 is coupled to the rectifier 231 for receiving the voltage peak Vpeak of the rectified signal. The second input terminal (−) of the second comparator 239 is coupled to the operation unit 237 for receiving the operated signal Vm. The second comparator 239 compares the adjusted stored voltage (i.e. the operated signal Vm) and the voltage peak to output the control signal Vopa2 to the level control unit 236. Therefore, if the adjusted signal Vm is larger than or equal to the voltage peak Vpeak, the level control unit 236 increases bits of the adjusting signal EQ_bits for adjusting the gain of the signal booster 210, and a method thereof is to adjust a bit value of a register in the signal booster 210. Comparatively, if the adjusted signal Vm is smaller than the voltage peak Vpeak, the level control unit 236 stops increasing the bits of the adjusting signal EQ_bits.

In other words, in the present exemplary embodiment, when the bits of the adjusting signal EQ_bits are increased, the signal booster 210 boosts the high frequency gain for the signal S2, and adjusts the minimum value MIN of the signal packages, so that the ratio of the maximum value MAX and the minimum value MIN is not less than the specific value. Since the higher the adjusting signal EQ_bits is, the more the high frequency content of the signal S2 is, and the higher the minimum value MIN of the packages of the signal S2 is, when the ratio of the maximum value MAX and the minimum value MIN is less than the specific value, the adaptive control loop 230 can adjust the minimum value MIN through the level control unit 236, so that the ratio of the maximum value and the minimum value is accordingly adjusted to be larger than or equal to the specific value, so as to achieve the effect of compensating the signal S2.

According to the above operations of the second comparison unit 234 and the level control unit 236, it is known that the second comparison unit 234 and the level control unit 236 are used to determine whether the minimum value MIN of the packages of the signal S2 has been optimized. Namely, when the voltage peak Vpeak is smaller than or equal to the stored voltage Va, charging of the capacitor Cp is stopped, and the stored voltage Va is not increased. Then, the stored voltage Va is multiplied by a specific multiple to generate the signal vm. Thereafter, the second comparator 239 compares the voltage peak Vpeak with the adjusted signal Vm to control the operation of the level control unit 236 to increase or stop increasing the bits of the adjusting signal EQ_bits.

Therefore, in the present exemplary embodiment, the adaptive equalizer 200 has a simple architecture, and the adaptive control loop 230 can determine the signal level through only one rectifier and the comparators.

In the present exemplary embodiment, the signal booster 210 may have the positive gain, and the signal booster 210 receives the signal S2 transmitted by a channel and boosts the high frequency gain thereof, though the disclosure is not limited thereto.

In another exemplary embodiment, the signal booster may also have a negative gain, which receives the signal S2 transmitted by a channel and reduces low frequency gain thereof In other words, when the bits of the adjusting signal EQ_bits are increased, the signal booster 210 reduces the low frequency gain for the signal S2, and adjusts the maximum value MAX of the packages of the signal S2, so that the ratio of the maximum value MAX and the minimum value is not less than the specific value. Therefore, when the ratio of the maximum value MAX and the minimum value of the packages of the signal S2 is less than the specific value, the adaptive control loop 230 can adjust the maximum value MAX through the level control unit 236, so that the ratio of the maximum value and the minimum value is accordingly adjusted to be larger than or equal to the specific value, so as to achieve the effect of compensating the signal S2.

In the present exemplary embodiment, the adaptive equalizer 200 can also be a hybrid equalizer, i.e. has both functions of increasing the high frequency gain and degreasing the low frequency gain. In detail, the signal booster 210 of the present exemplary embodiment can progressively change the gain value, and the level control unit 236 divides the adjusting signal EQ_bit into several segments. For example, the adjusting signal EQ_bit has 12 bits, which can be divided into four segments, and each segment has 3 bits, and the positive gain and the negative gain are alternately changed corresponding to different segments. For example, the bits of the first and the third segments correspond to the positive gain, and the bits of the second and the fourth segments correspond to the negative gain. Each time when the level control unit 236 receives a positive control signal, it increases one bit of the signal booster 210. It should be noticed that the various device of the present exemplary embodiment are interdependent, so that each time when the level control unit 236 receives the positive control signal, it increases one bit of the signal booster 210 to increase the high frequency gain. Similarly, each time when the level control unit 236 receives a negative control signal, it increases one bit of the signal booster 210 to decrease the low frequency gain.

Figure 5:
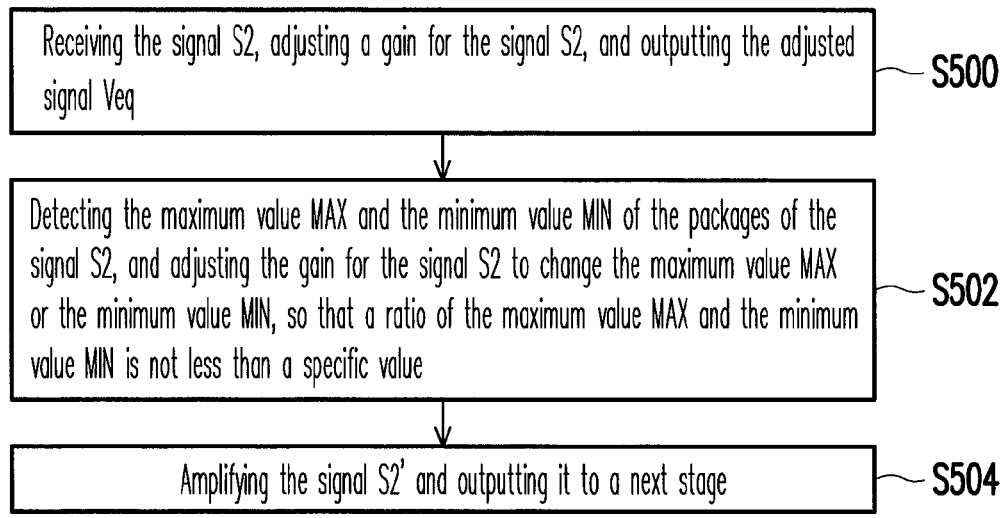
FIG. 5 is a flowchart illustrating an adaptive equalizing method according to an exemplary embodiment of the disclosure.

FIG. 5 is a flowchart illustrating an adaptive equalizing method according to an exemplary embodiment of the disclosure. Referring to FIG. 2A and FIG. 5, the adaptive equalizing method of the present exemplary embodiment includes following steps.

First, in step S500, the signal booster 210 receives the signal S2, and adjusts gain for the signal S2, and outputs the adjusted signal Veq. Then, in step S502, the adaptive control loop 230 detects the maximum value MAX and the minimum value MIN of the packages of the signal S2, and adjusts the gain for the signal S2 to change the maximum value MAX or the minimum value MIN, so that a ratio of the maximum value MAX and the minimum value MIN is not less than a specific value. It should be noticed that in the step S500, the signal booster 210 can increase the high frequency gain for the signal S2 or reduce the low frequency gain for the signal S2 according to an actual design requirement. Therefore, corresponding to the gain adjustment of the signal booster 210, in the step S502, the adaptive control loop 230 can adjust the maximum value MAX or the minimum value MIN, so that a ratio there between is not less than the specific value. Then, in step S504, the amplifier unit 220 amplifies the signal S2' and output it to a next stage.

Moreover, since those skilled in the art can learn enough instructions and recommendations of the adaptive equalizing method of the present exemplary embodiment from the descriptions of the exemplary embodiments of FIG. 1A-FIG. 4, detailed description thereof is not repeated.

In the foregoing exemplary embodiments of the disclosure, a high frequency for the adaptive equalizer and the method thereof may be defined as the frequency higher than the data rate of the signal transmitted by the channel. By contrast, a low frequency for the adaptive equalizer and the method thereof may be defined as the frequency lower than the data rate of the signal transmitted by the channel. In other words, in this exemplary embodiment, high frequency gain is the gain of the signal booster 210 at a frequency higher than a data rate of the signal transmitted by the channel, and low frequency gain is the gain of the signal booster 210 at a frequency lower than a data rate of the signal transmitted by the channel.

In summary, in the disclosure, the adaptive equalizer has a simple architecture, and according to the adaptive equalizing method, usage of a complicated circuit is unnecessary, and any data pattern can be used without pre-detecting the pattern, so that the channel loss can be effectively compensated. The previously described exemplary embodiments of the invention have the advantages aforementioned, wherein the advantages aforementioned not required in all versions of the invention.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An adaptive equalizer, adapted to compensate a signal transmitted by a channel, the adaptive equalizer comprising:
    a signal booster receiving the signal, adjusting a gain for the signal, and outputting the adjusted signal;
    an amplifier unit coupled to the signal booster, amplifying the signal, and outputting the signal to a next stage; and
    an adaptive control loop coupled to the signal booster, detecting a maximum value and a minimum value of packages of the signal, and outputting an adjusting signal to adjust the gain of the signal booster to change the maximum value or the minimum value, so that a ratio of the maximum value and the minimum value is not less than a specific value.

2. The adaptive equalizer as claimed in claim 1, wherein the adaptive control loop comprises:
    a first comparison unit coupled to the signal booster, receiving and rectifying the signal, comparing a voltage peak of the rectified signal with a stored voltage, and outputting the stored voltage corresponding to the voltage peak according to the comparison result.

3. The adaptive equalizer as claimed in claim 2, wherein the adaptive control loop further comprises:
    a second comparison unit coupled to the first comparison unit, adjusting the stored voltage corresponding to the voltage peak, comparing the adjusted stored voltage with the voltage peak to output a control signal, and accordingly adjusting the gain of the signal booster.

4. The adaptive equalizer as claimed in claim 3, wherein the adaptive control loop further comprises:
    a level control unit coupled to the second comparison unit and outputting the adjusting signal to the signal booster according to the control signal, so as to adjust the gain of the signal booster.

5. The adaptive equalizer as claimed in claim 4, wherein when the adjusted stored voltage is larger than or equal to the voltage peak, the level control unit increases bits of the adjusting signal.

6. The adaptive equalizer as claimed in claim 5, wherein when the adjusted stored voltage is smaller than the voltage peak, the level control unit stops increasing the bits of the adjusting signal.

7. The adaptive equalizer as claimed in claim 5, wherein when the bits of the adjusting signal are increased, the signal booster increases high frequency gain for the signal, wherein the high frequency gain is the gain of the signal booster at a frequency higher than a data rate of the signal transmitted by the channel.

8. The adaptive equalizer as claimed in claim 7, wherein when the high frequency gain for the signal is increased, the adaptive control loop adjusts the minimum value, so that the ratio of the maximum value and the minimum value is not less than the specific value.

9. The adaptive equalizer as claimed in claim 5, wherein when the bits of the adjusting signal are increased, the signal booster decreases low frequency gain for the signal, wherein the low frequency gain is the gain of the signal booster at a frequency lower than a data rate of the signal transmitted by the channel.

10. The adaptive equalizer as claimed in claim 9, wherein when the low frequency gain for the signal is decreased, the adaptive control loop adjusts the maximum value, so that the ratio of the maximum value and the minimum value is not less than the specific value.

11. The adaptive equalizer as claimed in claim 3, wherein the first comparison unit comprises:
    a rectifier coupled to the signal booster, receiving and rectifying the signal, and outputting the voltage peak of the rectified signal;
    a first comparator having a first input terminal, a second input terminal and an output terminal, wherein the first input terminal is coupled to the rectifier to receive the voltage peak of the rectified signal, the second input terminal receives the stored voltage, and the first comparator compares the voltage peak of the rectified signal with the stored voltage to output a comparison signal; and
    a voltage storage unit coupled to the second input terminal and the output terminal of the first comparator, receiving the comparison signal, and providing the stored voltage to the first comparator and the second comparison unit, wherein a magnitude of the stored voltage is controlled by the comparison signal.

12. The adaptive equalizer as claimed in claim 11, wherein the second comparison unit comprises:
an operation unit coupled to the voltage storage unit and adjusting the stored voltage corresponding to the voltage peak; and
a second comparator having a first input terminal, a second input terminal, and an output terminal, wherein the first input terminal is coupled to the rectifier to receives the voltage peak of the rectified signal, the second input terminal is coupled to the operation unit to receive the adjusted stored voltage, and the second comparator compares the adjusted stored voltage and the voltage peak to output the control signal.

13. The adaptive equalizer as claimed in claim 11, wherein the voltage storage unit comprises:
a current source providing a charging current;
a switch device coupled to the current source and the output terminal of the first comparator and being turned on or turned off according to the comparison signal; and
a capacitor having a first end and a second end, wherein the first end is coupled to the switch device and the second input terminal of the first comparator to provide the stored voltage to the first comparator, and the second end of the capacitor is grounded.

14. The adaptive equalizer as claimed in claim 13, wherein when the voltage peak of the rectified signal is larger than the stored voltage, the first comparator outputs the comparison signal with a first level to turn on the switch device, so that the current source charges the capacitor.

15. The adaptive equalizer as claimed in claim 14, wherein when the voltage peak of the rectified signal is smaller than or equal to the stored voltage, the first comparator outputs the comparison signal with a second level to turn off the switch device.

16. The adaptive equalizer as claimed in claim 15, wherein when the voltage peak of the rectified signal is smaller than or equal to the stored voltage, the capacitor provides the stored voltage corresponding to the voltage peak to the second comparison unit.

17. An adaptive equalizing method, adapted to compensate a signal transmitted by a channel, the adaptive equalizing method comprising:
receiving the signal, adjusting a gain for the signal, and outputting the adjusted signal;
amplifying the signal and outputting the signal to a next stage; and
detecting a maximum value and a minimum value of packages of the signal, and adjusting the gain for the signal to change the maximum value or the minimum value, so that a ratio of the maximum value and the minimum value is not less than a specific value.

18. The adaptive equalizing method as claimed in claim 17, wherein the step of detecting the maximum value and the minimum value of packages of the signal comprises:
receiving and rectifying the signal;
comparing a voltage peak of the rectified signal with a stored voltage; and
outputting the stored voltage corresponding to the voltage peak according to the comparison result.

19. The adaptive equalizing method as claimed in claim 18, wherein the step of adjusting the maximum value or the minimum value comprises:
adjusting the stored voltage corresponding to the voltage peak; and
comparing the adjusted stored voltage and the voltage peak to output a control signal.

20. The adaptive equalizing method as claimed in claim 19, wherein the step of adjusting the maximum value or the minimum value further comprises:
outputting an adjusting signal to a signal booster according to the control signal, so as to adjust a gain of the signal booster.

21. The adaptive equalizing method as claimed in claim 20, wherein when the adjusted stored voltage is larger than or equal to the voltage peak, bits of the adjusting signal are increased.

22. The adaptive equalizing method as claimed in claim 21, wherein when the adjusted stored voltage is smaller than the voltage peak, increasing of the bits of the adjusting signal is stopped.

23. The adaptive equalizing method as claimed in claim 21, wherein when the bits of the adjusting signal are increased, high frequency gain for the signal is increased, wherein the high frequency gain is the gain of the signal booster at a frequency higher than a data rate of the signal transmitted by the channel.

24. The adaptive equalizing method as claimed in claim 23, wherein when the high frequency gain for the signal is increased, the minimum value is adjusted, so that the ratio of the maximum value and the minimum value is not less than the specific value.

25. The adaptive equalizing method as claimed in claim 21, wherein when the bits of the adjusting signal are increased, low frequency gain for the signal is decreased, wherein the low frequency gain is the gain of the signal booster at a frequency lower than a data rate of the signal transmitted by the channel.

26. The adaptive equalizing method as claimed in claim 25, wherein when the low frequency gain for the signal is decreased, the maximum value is adjusted, so that the ratio of the maximum value and the minimum value is not less than the specific value.

* * * * *